United States Patent
Bräuer et al.

(10) Patent No.: US 7,717,775 B2
(45) Date of Patent: May 18, 2010

(54) FILTER FOR SUSPENDED PARTICLES, ESPECIALLY FOR USE IN CLEAN ROOMS

(75) Inventors: Ralf Bräuer, Stuttgart (DE); Tahir Dincsoy, Plüderhausen (DE)

(73) Assignee: M+W Zander Holding AG, Stuttgart (DE)

( * ) Notice: Subject to any disclaimer, the term of this patent is extended or adjusted under 35 U.S.C. 154(b) by 0 days.

(21) Appl. No.: 11/423,156

(22) Filed: Jun. 9, 2006

(65) Prior Publication Data

US 2006/0281399 A1    Dec. 14, 2006

(30) Foreign Application Priority Data

Jun. 10, 2005    (DE) .................. 20 2005 009 505 U

(51) Int. Cl.
- *F24F 13/078* (2006.01)
- *F24F 3/056* (2006.01)
- *B01L 1/04* (2006.01)
- *B01D 50/00* (2006.01)

(52) U.S. Cl. .............. 454/187; 454/293; 55/385.2; 55/484; 362/149

(58) Field of Classification Search ............ 454/187, 454/293, 294; 362/149; 55/385.2, 484
See application file for complete search history.

(56) References Cited

U.S. PATENT DOCUMENTS

| | | | |
|---|---|---|---|
| 3,786,233 A * | 1/1974 | Bumpus et al. ........... 392/416 |
| 4,549,472 A * | 10/1985 | Endo et al. ................ 454/187 |
| 4,554,766 A | 11/1985 | Ziemer et al. |
| 4,678,487 A * | 7/1987 | Cadwell et al. ........... 55/385.1 |
| 5,192,348 A * | 3/1993 | Ludwig .................... 55/385.2 |
| 5,417,610 A * | 5/1995 | Spransy .................... 454/187 |
| 5,454,756 A * | 10/1995 | Ludwig .................... 454/296 |
| 5,613,759 A * | 3/1997 | Ludwig et al. ............ 362/149 |
| 5,620,369 A * | 4/1997 | Spransy et al. ............ 454/187 |
| 5,865,674 A * | 2/1999 | Starr ........................ 454/187 |
| 5,993,311 A | 11/1999 | Feller et al. |
| 2003/0010211 A1 * | 1/2003 | Yu ............................... 96/16 |
| 2003/0040269 A1 * | 2/2003 | Yokoyama et al. ........ 454/52 |
| 2004/0083895 A1 * | 5/2004 | Kim .......................... 96/414 |
| 2004/0170537 A1 * | 9/2004 | Hara ......................... 422/122 |

FOREIGN PATENT DOCUMENTS

| | | |
|---|---|---|
| DE | 3801425 | 8/1989 |
| FR | 2625524 A1 * | 7/1989 |
| JP | 61291849 | 3/1986 |
| JP | 62073026 A * | 4/1987 |
| JP | 63274426 A * | 11/1988 |
| JP | 2003102815 A * | 4/2003 |
| JP | 2004105415 | 4/2004 |
| WO | 00/06953 | 2/2000 |

* cited by examiner

*Primary Examiner*—Steven B McAllister
*Assistant Examiner*—Patrick F. O'Reilly, III
(74) *Attorney, Agent, or Firm*—Gudrun E. Huckett

(57) ABSTRACT

A filter for suspended particles for a clean room has at least one filter medium and at least one illumination device. The illumination device is arranged at least mostly within a vertical extension of the at least one filter medium. Alternatively, the illumination device is arranged in an area outside of an outflow cross-section of the at least one filter medium. The flow of clean air into the clean room is not disturbed in this way.

13 Claims, 2 Drawing Sheets

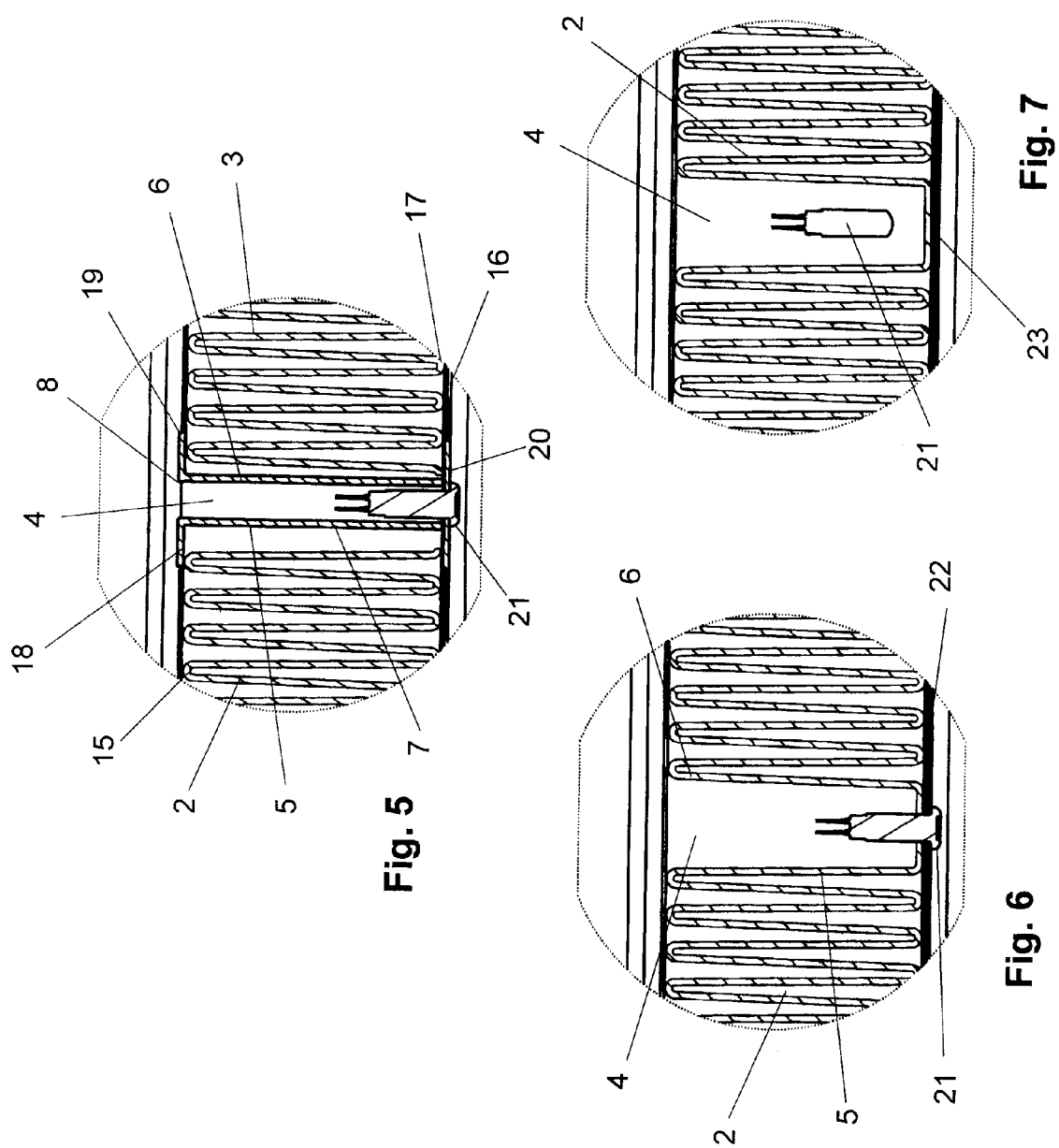

FILTER FOR SUSPENDED PARTICLES, ESPECIALLY FOR USE IN CLEAN ROOMS

BACKGROUND OF THE INVENTION

The invention relates to a filter for suspended particles, in particular for use in clean rooms, comprising at least one filter medium and at least one illumination means (lighting device).

Filters for suspended particles are provided in clean rooms, for example, in the ceiling area; the clean air passes through the filters before entering the clean room. For illuminating the clean room, illumination means are provided in the ceiling area and are fastened within the frame of the filters for suspended particles; usually, they are arranged in the area below the filters for suspended particles. The illumination means disturb the flow conditions because they are located in the downward direction within the flow area of the clean air exiting from the filters for suspended particles. Moreover, this arrangement also limits the available inner height of the clean room.

SUMMARY OF THE INVENTION

It is an object of the present invention to configure a filter for suspended particles in such a way that the illumination means can be provided without any problems on the filter for suspended particles.

In accordance with the present invention, this is achieved in that the illumination means is arranged or located at least mostly within the height (vertical extension) of the filter medium.

In the filter for suspended particles in accordance with the present invention, the illumination means is/are arranged such that they are located at least mostly substantially within the extension of the height of the filter medium. In this way, the illumination means does not disturb the flow conditions of the clean air when exiting the filter medium. Despite of this, the illumination means provides a satisfactory illumination. Because the illumination means is arranged moreover in the inner area of the filter medium, it is not necessary to separately mount the illumination means. Instead, the illumination means is mounted together with the filter for suspended particles in one step.

In another embodiment, the illumination means is arranged at least mostly within the extension of the height of the frame of the filter. In this way, it is also ensured that the illumination means does not impair the flow conditions and still provides satisfactory illumination.

BRIEF DESCRIPTION OF THE DRAWING

FIG. 5 shows an enlarged illustration of the detail V of FIG. 4.

FIG. 6 shows in an illustration in accordance with FIG. 5 a second embodiment of the filter for suspended particles according to the present invention.

FIG. 7 is an illustration in accordance with FIG. 5 of a third embodiment of the filter for suspended particles in accordance with the present invention.

DESCRIPTION OF THE PREFERRED EMBODIMENTS

Figure 3:
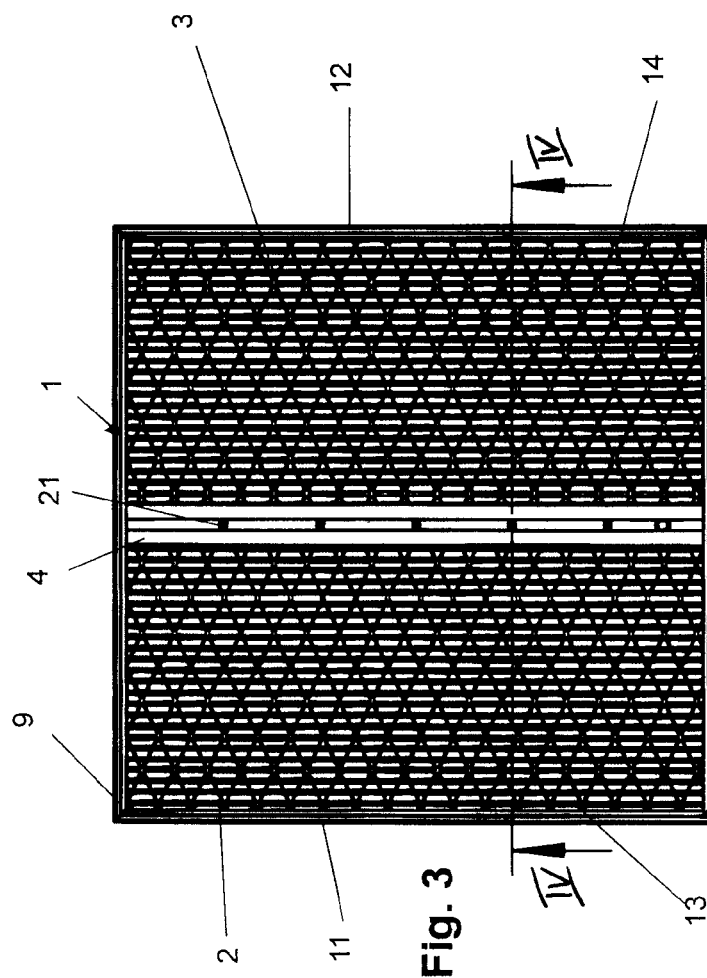
FIG. 3 is a plan view of the filter for suspended particles of FIG. 1.
Figure 4:
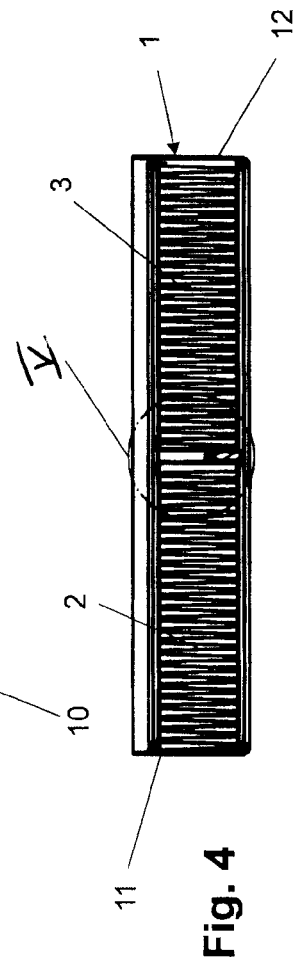
FIG. 4 shows a section along section line IV-IV of FIG. 3.
Figure 1:
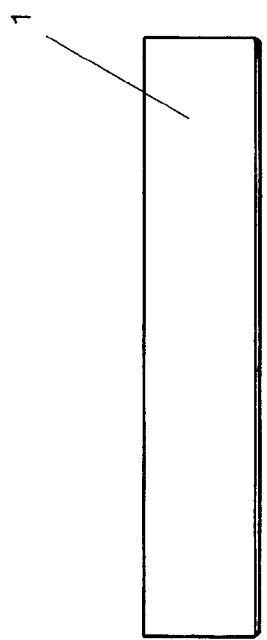
FIG. 1 is a front view of a filter for suspended particles in accordance with the present invention.
Figure 2:
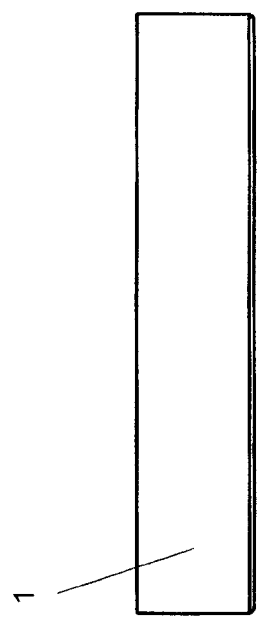
FIG. 2 is a side view of the filter for suspended particles of FIG. 1.

The filter for suspended particles is advantageously used in clean rooms and has a frame 1 that has a square contour in the illustrated embodiment. The frame can also be rectangular or can have any other suitable polygonal or even round contour. The frame 1 is comprised advantageously of a metallic material, preferably aluminum. The frame 1 surrounds two filter media 2 and 3 that are separated from one another at approximately half the width of the frame 1 by an intermediate space 4. The intermediate space 4 is delimited by two parallel extending sidewalls 5, 6 that form a part of a profiled section 7, 8, respectively (FIG. 5). The sidewalls 5, 6 extend between opposed frame sides 9, 10 and adjoin them perpendicularly. The sidewalls 5, 6 are positioned at half the width of the frame 1 and extend parallel to the frame sides 11, 12. The frame sides 9, 10, 11 as well as the sidewall 5 delimit a first receiving chamber 13, and the frame sides 9, 10, 12 and the sidewall 6 delimits a second receiving chamber 14 for the filter media 2, 3, respectively. Both receiving chambers 13, 14 are advantageously of the same size. Depending on the configuration of the filter for suspended particles, the receiving chambers 13, 14 can also be sized differently. Moreover, it is possible to provide more than two receiving chambers 13, 14 within the filter for suspended particles so that accordingly two or more intermediate spaces 4 are provided.

The filter media 2, 3 are of a conventional configuration/design and have a folded structure. The filter media 2, 3 extend between opposed frame sides 9, 10 and between frame sides 11, 12 and the opposed sidewalls 5, 6 of the intermediate space 4. The filter media 2, 3 are positioned between an upper hand guard 15 and a lower hand guard 16; such a hand guard is known in connection with filters for suspended particles and will therefore not be explained in more detail in this connection. The lower hand guard 16 can be provided with a laminate 17.

As shown in FIG. 5, the profiled sections 7, 8 have an L-shaped cross-section. The sidewalls 5, 6 are the vertical legs of the profiled sections 7, 8 that pass at the upper end into a short leg 18, 19, respectively. By means of the legs 18, 19 the profiled sections 7, 8 engage across the neighboring ends of the filter media 2, 3 so that the neighboring ends are secured properly with regard to their position. The legs 18, 19 extend, beginning at the vertical sidewalls 5, 6, in opposite directions away from one another. At the lower end, the two vertical sidewalls 5, 6 of the profiled sections 7, 8 project perpendicularly upwardly from a strip 20 that extends past the sidewalls 5, 6 of the profiled sections 7, 8 to the same extent as the upper short legs 18, 19. The strip 20 is positioned at the level of the lower hand guard 16 and has advantageously the same thickness as the hand guard 16.

The intermediate space 4 is a mounting space in which at least one illumination means (lighting device) 21 is provided. As shown in the embodiment of FIG. 3, five illumination means 21 are arranged in a row in the intermediate space 4 at a spacing behind one another; advantageously, they are in the form of LEDs. instead of LEDs, conventional incandescent lamps or other illumination means can be used. In order for the light emitted by the illumination means 21 to reach the area underneath, the strip 20 can be made to be transparent in the illumination or emission range of the illumination means 21. However, it is also possible to provide the strip 20 with openings into which the illumination means 21 are inserted in such a way that the light emitted by them can radiate downwardly into the clean room. The strips 20 and the lower hand guard 16 are recessed relative to the rim of the frame 1 (FIG. 5).

The mounting openings for the illumination means 21 are recommended when the illumination means are in the form of LEDs that have only a small cross-section. For larger size light sources, for example, fluorescent tubes, it is advantageous to arrange them behind the strip 20 so that they are covered by the strip 20 and to configure the strip 20 with a light-transmissive portion.

Since the illumination means 21 is positioned between sidewalls 5, 6, the filter media 2, 3 are protected behind these sidewalls. The sidewalls 5, 6 can be designed such that they protect the filter media 2, 3 from the heat generated by the illumination means.

FIG. 6 shows a second embodiment of a filter for suspended particles. The intermediate space 4 is formed by an area of the filter medium 2 that is not folded. While in the area outside of the intermediate space 4 the filter medium is folded to a V-shape, the filter medium 2 in this embodiment extends in a U-shape in the area that is not folded. In this way, the two sidewalls 5, 6 are formed by parts of the filter medium 2. It is also possible to employ two filter media 2, 3 that have neighboring ends connected to one another such that the sidewalls 5, 6 are formed. In this case, it is possible, for example, to form the bottom 22 of the intermediate space 4 in such a way that the angled edges of the two filter media 2, 3 are placed on top one another and connected to one another. This has the advantage that the bottom 22 has a high stability so that the illumination means 21 can be attached to it, for example, by an adhesive. Since the filter medium itself is light-transmissive, separate light passages in the bottom 22 of the intermediate space 4 must not be provided. Advantageously, an LED is used as the illumination means 21; an LED is characterized by an extended service life as well as minimal heat development. In accordance with the specific requirements, the required number of illumination means 21 can be arranged in the intermediate space 4. Since in this embodiment, additional profiled sections for limiting the intermediate space 4 relative to the filter media 2, 3 are not required, this filter for suspended particles can be inexpensively produced.

In the embodiment according to FIG. 7, similar to the embodiment according to FIG. 6, an intermediate space 4 is formed by an unfolded area of the filter medium 2. In the intermediate space 4 the illumination means 21 is provided; it is an LED in the illustrated embodiment. The LED 21 can also be formed, for example, by a fluorescent tube or another light source. The intermediate space 4 is limited downwardly by the filter medium itself. This part of the filter medium 2 forms a cover 23 of the intermediate space 4. The illumination means 21 has such a luminous intensity that the light can pass through the filter medium downwardly into the clean room. Air can flow through the filter medium 2 in the entire area of the intermediate space 4, in particular also in the area below the illumination means 21. A particle-tight configuration of a light passage of the illumination means at the clean room side, as disclosed in connection with the embodiments according to FIG. 5 and FIG. 6, is not required.

Basically it is also possible to provide two filter media that are positioned at a spacing adjacent to one another and delimit the intermediate space 4 laterally. In this case, in contrast to the illustrated embodiment of FIG. 7, below the illumination means 21 only the cover 23 is provided but not the bottom 22 formed by the unfolded part of the filter medium 2.

In the described embodiments, the illumination means are protected within the intermediate space 4. In particular, the illumination means 21 do not project downwardly past the filter medium 2 or 3 or the filter for suspended particles as a whole so that the flow conditions underneath the filter for suspended particles is not disrupted by the illumination means. In this way, it is possible to optimally illuminate the area below the filter for suspended particles and to ensure despite of this optimal flow conditions.

Moreover, the illumination means 21 are arranged in the area outside of the outflow cross-section of the filter medium 2, 3 so that the flow conditions of the clean air and the inner height of the clean room are not impaired.

The specification incorporates by reference the entire disclosure of German priority document 20 2005 009 505.2 having a filing date of Jun. 10, 2005.

While specific embodiments of the invention have been shown and described in detail to illustrate the inventive principles, it will be understood that the invention may be embodied otherwise without departing from such principles.

What is claimed is:

1. A unitary filter assembly for suspended particles for a clean room, the unitary filter assembly comprising:
    a frame defining the peripheral extent of the unitary filter assembly and consisting of two first parallel continuous frame sides, two second parallel continuous frame sides, and two parallel continuous sidewalls, wherein the two second parallel frame sides are arranged perpendicularly to the two first parallel frame sides and connected to opposite ends of the two first parallel frame sides, respectively, so as to define a frame interior and wherein the two parallel sidewalls extend parallel to the two second parallel frame sides and are connected perpendicularly to the two first parallel frame sides at a spacing from the ends of the two first parallel frame sides to an inwardly facing side of the two first parallel frame sides so that said frame interior of said frame is divided into a first and a second receiving chambers and an intermediate space between the first and second receiving chambers;
    filter media arranged inside said frame in the first and second receiving chambers, respectively, wherein a direction of flow of air to be filtered through the filter media is parallel to the two sidewalls and the two first and the two second parallel frame sides;
    wherein in the intermediate space at least one illumination means which illuminates a space outside of the unitary filter assembly is arranged;
    and wherein the at least one illumination means is separated from the filter media on a first side only by a first of the two parallel sidewalls and is separated from the filter media on a second side only by a second of the two parallel sidewalls.

2. The unitary filter assembly according to claim 1 wherein the at least one illumination means is arranged at least mostly within a vertical extension of the frame.

3. The unitary filter assembly according to claim 2, wherein the at least one illumination means is positioned at a spacing above a lower edge of the frame.

4. The unitary filter assembly according to claim 1, wherein the sidewalls are profiled sections.

5. The unitary filter assembly according to claim 1, wherein the intermediate space is partially covered by a cover in a downward direction toward a clean room.

6. The unitary filter assembly according to claim 5, wherein the cover has at least one light-transmissive area.

7. The unitary filter assembly according to claim 5, wherein the cover has at least one opening in which opening the at least one illumination means is inserted.

8. The unitary filter assembly according to claim 1, wherein the illumination means is an LED or a fluorescent tube.

9. A filter for suspended particles for a clean room, the filter comprising:
- a frame comprised of two first parallel frame sides and two second parallel frame sides arranged perpendicularly to the two first parallel frame sides and connected to opposite ends of the two first parallel frame sides, respectively;
- at least one filter medium arranged in the frame, wherein the at least one filter medium has first and second sections where the filter medium is folded to V-shaped folds and an intermediate U-shaped section where the filter medium is not folded to V-shaped folds and extends straight, wherein said intermediate U-shaped section is arranged between the first and second sections and wherein said intermediate U shaped section is a mounting space;
- at least one illumination means arranged within the mounting space.

10. The filter according to claim 9, wherein the mounting space is partially covered by a cover in a downward direction toward a clean room.

11. The filter according to claim 10, wherein the cover has at least one light-transmissive area.

12. The filter according to claim 10, wherein the cover has at least one opening in which opening the at least one illumination means is inserted.

13. The filter according to claim 9, wherein the illumination means is an LED or a fluorescent tube.

* * * * *